(12) United States Patent
Borgarelli et al.

(10) Patent No.: US 12,480,549 B2
(45) Date of Patent: Nov. 25, 2025

(54) LINEAR ELECTROMECHANICAL ACTUATOR

(71) Applicant: UMBRAGROUP S.p.A., Foligno PG (IT)

(72) Inventors: Nicola Borgarelli, Foligno PG (IT); Luciano Pizzoni, Foligno PG (IT)

(73) Assignee: UMBRAGROUP S.p.A., Foligno PG (IT)

( * ) Notice: Subject to any disclaimer, the term of this patent is extended or adjusted under 35 U.S.C. 154(b) by 193 days.

(21) Appl. No.: 18/377,858

(22) Filed: Oct. 9, 2023

(65) Prior Publication Data
US 2024/0117846 A1  Apr. 11, 2024

(30) Foreign Application Priority Data
Oct. 10, 2022  (IT) .................. 102022000020793

(51) Int. Cl.
*F16D 3/60* (2006.01)
*F16D 27/14* (2006.01)
(Continued)

(52) U.S. Cl.
CPC .............. *F16D 3/60* (2013.01); *F16D 27/14* (2013.01); *F16D 2121/24* (2013.01); *F16D 2125/40* (2013.01)

(58) Field of Classification Search
CPC ........ F16D 3/60; F16D 27/14; F16D 2121/24; F16D 2125/40; F16H 25/2056; F16H 25/205
See application file for complete search history.

(56) References Cited

U.S. PATENT DOCUMENTS 4,179,944 A * 12/1979 Conner ................. H02K 7/06
                                                      192/141
4,637,272 A *  1/1987 Teske .................. F16H 25/205
                                                       244/99.2
(Continued)

FOREIGN PATENT DOCUMENTS

DE        3910814         10/1990
ES        2886917 T3 *    12/2021  ......... F16H 25/2454

OTHER PUBLICATIONS

International search report and written opinion dated Mar. 30, 2023; Application No. IT102022000020793; 9 pages.

*Primary Examiner* — Jeffrey O'Brien
(74) *Attorney, Agent, or Firm* — RANKIN, HILL & CLARK LLP; Erik J. Overberger

(57) ABSTRACT

Linear electromechanical actuator (1), comprising a containment structure (2); a pusher (3); a mechanical reduction apparatus (4); drive means (5) operatively connected to said mechanical reduction apparatus (4) to rotate it about said rotation axis (X); a shaft (6) connected to said mechanical reduction apparatus (4) such that a rotation of said mechanical reduction apparatus (4) determines a translation of the shaft (6) along said rotation axis (X); an active anti-rotation mechanism; the mechanical reduction apparatus (4) comprises a nut (8) and a longitudinal pushing element independent of each other and rotatable about said rotation axis (X) under the action of said drive means (5); said longitudinal pushing element (9) being fitted into said nut (8); coupling means (10, 11, 15, 16) configured to mechanically couple said nut (8) and said longitudinal pushing element (9) with said shaft (6), such that a rotation of said nut (8) and/or of said longitudinal pushing element (9) determines a translation of said shaft (6) along said rotation axis (X); said coupling means (10, 11, 15) comprising: an intermediate coupling stage (10) interposed between the nut (8) and the (Continued)

longitudinal pushing element (9), said shaft (6) being at least partially fitted into said intermediate coupling stage and into said longitudinal pushing element (9).

13 Claims, 8 Drawing Sheets

(51) Int. Cl.
 *F16D 121/24* (2012.01)
 *F16D 125/40* (2012.01)

(56) References Cited

U.S. PATENT DOCUMENTS

| | | | | |
|---|---|---|---|---|
| 4,745,815 A | * | 5/1988 | Klopfenstein | B64C 13/38 |
| | | | | 74/89.25 |
| 4,858,491 A | * | 8/1989 | Shube | B64C 13/341 |
| | | | | 192/141 |
| 6,880,416 B2 | * | 4/2005 | Koch | F16H 25/2056 |
| | | | | 74/89.35 |
| 6,981,428 B2 | * | 1/2006 | Donald | F16K 31/047 |
| | | | | 74/89.26 |
| 9,016,151 B2 | * | 4/2015 | Golding | F16H 19/04 |
| | | | | 74/89.29 |
| 9,371,895 B2 | * | 6/2016 | Pizzoni | F16H 25/24 |
| 9,685,838 B2 | * | 6/2017 | Ueyama | F16H 25/205 |
| 10,527,141 B2 | * | 1/2020 | Huebner | F16H 25/2015 |
| 11,105,404 B2 | * | 8/2021 | Borgarelli | H02K 7/102 |
| 11,239,728 B2 | * | 2/2022 | Borgarelli | F16H 25/20 |
| 11,976,711 B2 | * | 5/2024 | Borgarelli | B64C 13/28 |
| 2002/0182006 A1 | * | 12/2002 | Capewell | F16H 25/2204 |
| | | | | 403/403 |
| 2005/0269887 A1 | * | 12/2005 | Blanding | F16H 25/2015 |
| | | | | 310/112 |
| 2013/0249464 A1 | * | 9/2013 | Knox | H02K 7/06 |
| | | | | 318/625 |
| 2024/0110605 A1 | * | 4/2024 | Jedele | F16D 65/18 |

\* cited by examiner

LINEAR ELECTROMECHANICAL ACTUATOR

FIELD OF APPLICATION

The present invention relates to a linear electromechanical actuator in accordance with the preamble to claim 1.

In particular, but not exclusively, the present invention relates to a linear electromechanical actuator for controlling a control surface of an aircraft, for example, for vertical take-off, of a boat or the steering system of a vehicle or similar applications.

A further object of the present invention is a method for checking the presence of an electrical, electronic and/or mechanical fault in a linear electromechanical actuator

DESCRIPTION OF THE PRIOR ART

Linear electromechanical actuators are known which are equipped with control and command electronics which are driven by an electric motor whose task is to transform the rotary motion of the electric motor into a linear back-and-forth motion of a pusher so as to control the positioning of a control surface.

To this end, the electric motor is connected, through a reduction apparatus, to the pusher which, in turn, is connected to the control surface to control the position which such a surface must assume as a function of the commands received from the control and command electronics.

Usually, the reduction apparatus comprises a nut on which a screw slides (or a screw on which a nut slides) which, in turn, is connected to the pusher and, thanks to an anti-rotation device, the screw (or nut) is allowed only linear and non-rotational movement so as to obtain the linear back-and-forth motion of the pusher.

Such linear electromechanical actuators have been used, for example, to control what is known as the secondary control surfaces of an aircraft, such as air brakes, spoilers, slats, trim tabs but also to make it possible to open doors as well as for other uses which require low power, speed and response times, i.e., for all those applications known as "non-safety critical".

U.S. Pat. No. 4,179,944 describes an example of a linear electromechanical actuator equipped with two motors coupled directly to a shaft by means of recirculating ball nuts. Such an electromechanical actuator does not provide sufficient redundancy to ensure a "fault tolerance" for faults of both mechanical and electrical and electronic nature. In fact, such an electromechanical actuator allows the identification of only two types of mechanical faults related mainly to the moving shaft, it thus ensures a limited redundancy especially in the case of mechanical faults between motor and shaft. Furthermore, such an electromechanical actuator could have problems in the event of electrical and/or electronic faults linked to the electric motors. In fact, such motors should be sized to ensure operation both in operating conditions and in fault conditions such as, for example, to overcome torques due to mechanical faults in the event of a stall of one of the two motors.

Problems of the Prior Art

However, the reliability of an electromechanical actuator of the type described above does not allow the use thereof in installations dedicated to the control of primary control surfaces of an aircraft, the swashplate of a helicopter, the steering system of a vehicle or the rudder of a ship, i.e., more generally, of all those applications known as "safety critical".

This depends on the fact that the low reliability of the electromechanical actuator described above lies both in the electrical part, i.e., in the electric motor, in the control and command electronics as well as in the possibility of a seizing of the mechanical part (known as mechanical "jamming").

To date, to overcome such a problem, for example, architectures are used which have two identical actuators which move the same control surface, allowing an electrical, electronic and mechanical redundancy, but generally with consequent aggravations of weight and system complexity or a single actuator equipped with a differential gearbox which allows the use of two independent electric motors and two independent electronics which, moving the same mechanics.

Furthermore, the "safety critical" applications, such as those reported above, require very fast operating dynamics which do not allow the use of differential gearboxes generally characterized by overly high operating clearances.

Further documents US 2013249464, WO2010027701 and US 2005269887 disclose examples of electromechanical actuators which do not provide sufficient redundancy to ensure a "fault tolerance" for faults of a mechanical, electrical and electronic nature.

In particular, "US 464" and "WO 701" disclose actuators provided with two electric motors which are dependent on each other and coupled directly to the shaft to be moved by means of recirculating ball nuts. Therefore, a mechanical failure, for example related to the motor-shaft coupling for one or both of the motors, results in the blockage of the actuator itself. Furthermore, the motors must be sized to generate a torque capable of ensuring operation both in operating conditions and in electrical and/or electronic fault conditions of one of the two motors.

"US 887" instead discloses an actuator provided with a set of electric motors coupled directly to the shaft to be moved by recycling rollers. Therefore, also in this case, a mechanical fault related to the motor-shaft coupling results in the stall of the actuator itself, preventing the movement of the shaft.

Further documents disclose bulky electromechanical actuators in terms of length so as to ensure a shaft travel length suited to the specific applications. Such a longitudinal bulk results in construction and assembly problems within the relative seat with specific sizing.

Furthermore, there is an increasing need to detect electrical, electronic and/or mechanical faults and in particular what are known as latent failures of the actuator or actuators which are part of the architectures disclosed above. As is known, latent failures can act on a component, whether mechanical or electrical/electronic, on a circuit, or on a system and are those failures which have not yet occurred, but whose activation event has already occurred without there being an impossibility of using the architecture.

In particular, the architectures disclosed above are tested during the scheduled periodic inspections and, if no anomalies are highlighted, such architectures are judged to be completely efficient and therefore usable. However, during their use, undetected and/or undetectable faults could arise which have a more or less serious impact on efficiency, but such faults remain latent until the next inspection, thus affecting the guarantee proposed by redundancy.

This is a serious problem, especially if the electromechanical actuator is used in "safety critical" applications.

SUMMARY OF THE INVENTION

The object of the invention in question is to provide a linear electromechanical actuator capable of solving the problems of the state of the art just disclosed.

Such objects are achieved by means of a linear electromechanical actuator, according to claim 1 below.

It is a further object of the present invention to provide a method for checking an electrical, electronic and/or mechanical fault in a linear electromechanical actuator capable of solving the problems of the state of the art just disclosed.

Advantages of the Invention

Thanks to an embodiment of the present invention, it is possible to provide a linear electromechanical actuator of the Fault Tolerant Differential Direct Drive type which is also applicable for controlling primary control surfaces since it allows the translation of the pusher even in failure conditions of the electrical part, of the control electronics and/or of a seizing of the mechanical part.

Furthermore, thanks to an embodiment of the present invention, it is possible to provide a linear electromechanical actuator whose dynamic performance is much higher with respect to the electromechanical actuators which envisage for the use of differential systems such as gearboxes.

Furthermore, thanks to an embodiment of the present invention, it is possible to provide a linear electromechanical actuator with a generally reduced weight and dimensions with respect to electromechanical actuators which envisage the use of gearboxes and other differential devices. Specifically, the present invention allows to provide a longitudinally compact electromechanical actuator capable of maintaining the same stroke length of the shaft and therefore of the pusher for specific applications.

Furthermore, thanks to an embodiment of the present invention, it is possible to provide a linear electromechanical actuator with a higher reliability with respect to electromechanical actuators which envisage the use of gearboxes and other differential devices.

Furthermore, thanks to an embodiment of the present invention, it is possible to provide a linear electromechanical actuator capable of ensuring a tolerance to electronic, electrical and mechanical faults. In particular, the use of an intermediate stage increases the redundancies of the system, ensuring high reliability with respect to the electromechanical actuators currently employed in the known art as disclosed above.

Furthermore, thanks to an embodiment of the present invention, it is possible to provide a linear electromechanical actuator which allows to minimize friction, especially at low temperatures, optimizing the overall efficiency of the actuator with respect to electromechanical actuators which envisage the use of gearboxes and other differential devices.

Finally, thanks to an embodiment of the present invention, it is possible to provide a linear electromechanical actuator which allows to minimize failures related to the accumulation of material between the elements which compose it.

BRIEF DESCRIPTION OF THE DRAWINGS

The features and advantages of the present invention will become apparent from the following detailed description of a possible practical embodiment thereof, illustrated by way of non-limiting example in the accompanying drawings, in which.

DETAILED DESCRIPTION

Figure 1:
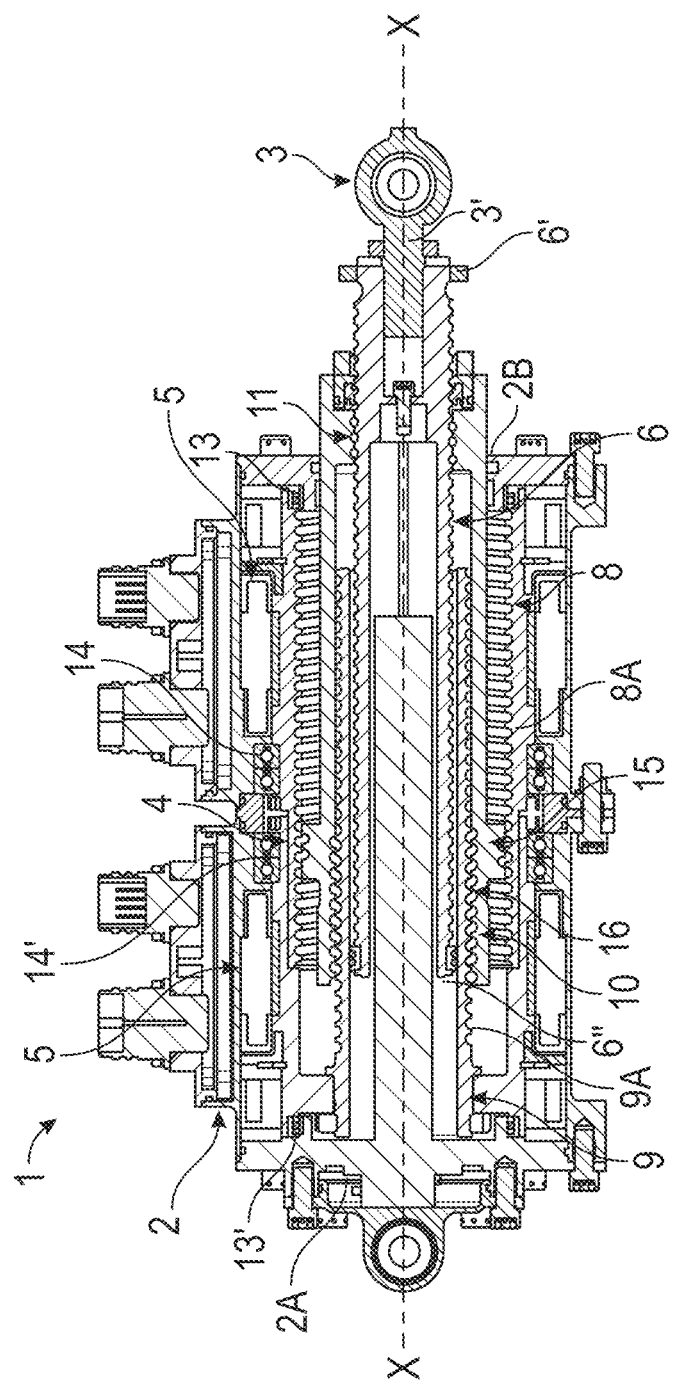
FIG. 1 shows a sectional view of the linear electromechanical actuator in accordance with a first embodiment of the present invention.

Even if not explicitly highlighted, the individual features disclosed with reference to the specific embodiments shall be understood as accessory to and/or interchangeable with other features disclosed with reference to other embodiments.

With reference to the appended figures, 1 represents overall a linear electromechanical actuator in accordance with the present invention.

With reference to FIGS. 2-7, the actuator 1 comprises a containment structure 2, preferably of a rigid type, and a pusher 3. Such a containment structure extends from a bottom 2A to an outlet opening 2B extended along a main extension direction.

The pusher 3 represents the active element of the actuator 1.

In particular, the pusher 3 is designed to translate, with respect to the containment structure 2, to at least partially exit from the containment structure 2, preferably from the outlet opening 2B, during the operation of the actuator 1.

The translation of the pusher 3 occurs through a special opening provided in the containment structure 2.

The actuator 1 comprises a mechanical reduction apparatus 4, arranged in the containment structure 2, which is configured to be rotatable about a rotation axis X.

The actuator 1 comprises drive means 5, arranged in the containment structure 2, which are operatively connected to the mechanical reduction apparatus 4 to rotate it about the axis X.

The actuator 1 comprises a shaft 6, fitted into the mechanical reduction apparatus 4, which is connected to the pusher 3.

In particular, the shaft 6 comprises a first terminal end 6' and a second terminal end 6", where the first terminal end 6' is connected to a coupling eyelet 3'. Said second terminal end 6" can exit out with the pusher 3 at least partially from the containment structure 2 during the operation of the actuator 1.

The actuator 1 comprises an anti-rotation mechanism which is active on the shaft 6 to prevent a rotation of the shaft itself about the rotation axis X. Specifically, the anti-rotation mechanism can be inside or outside the containment structure 2. In accordance with a preferred embodiment, the anti-rotation mechanism is indicated with 7 in FIG. 4.

The shaft 6 is therefore connected with the mechanical reduction apparatus 4 such that a rotation of the mechanical reduction apparatus 4 determines a translation of the shaft 6 along the rotation axis X and therefore a linear back-and-forth movement of the pusher 3.

Advantageously, the mechanical reduction apparatus 4 comprises a nut 8 and a longitudinal pushing element 9 which are independent of each other, i.e., they are two separate and distinct elements.

The nut 8 has a thread 8A thereof with the relative pitch preferably defined.

The longitudinal pushing element 9 along the rotation axis X in turn has a relative thread pitch when it has a defined pitch or movement pitch when in the form of a linear guide.

Specifically, as illustrated in the embodiments of FIGS. 1-6, the longitudinal pushing element 9 in accordance with an embodiment can be a screw with a defined thread pitch 9A on the relative external surface. Alternatively, the longitudinal pushing element 9 can be a linear guide 9B. Preferably, in this embodiment the linear guide 9B defines a relative movement pitch. In this case, the linear guide 9B has the relative external surface substantially smooth.

It should be noted that the nut 8 and the longitudinal pushing element 9 have a thread pitch or movement pitch thereof and, if present, a relative thread direction.

The nut 8 and the longitudinal pushing element 9 are rotatable about the rotation axis X under the action of the drive means 5.

The nut 8 and the pushing element 9 have a main extension direction which coincides with the aforementioned rotation axis X.

Both the nut 8 and the pushing element 9 are enabled to rotate only about the rotation axis X while each of them is prevented from translating along the rotation axis X for example by means of special locking shoulders or other solutions known to the person skilled in the art and therefore not described.

In order to obtain the rotation of the nut 8 and the longitudinal pushing element 9 about the rotation axis X, the actuator 1 comprises a pair of bearings 13, 13' active at the ends of the containment structure 2 acting respectively on the nut 8 and on the longitudinal pushing element 9. The actuator 1 further comprises a further pair of bearings 14, 14' active centrally in the containment structure 2 acting respectively on the nut 8 and on the longitudinal pushing element 9.

Thus the nut 8 and the longitudinal pushing element 9 are rotatable about the rotation axis X under the action of the drive means 5, which are connected to the nut and to the longitudinal pushing element either by means of a kinematic chain (for example a gearbox comprising a differential) or, preferably, directly connected to the nut and to the longitudinal pushing element as better explained below.

In accordance with a preferred embodiment, the longitudinal pushing element 9 is fitted into the nut 8. Specifically, the nut 8 has a substantially cylindrical hollow body inside which the longitudinal pushing element 9 extends. It should be noted that the nut 8 at least partly surrounds the longitudinal pushing element 9 extending from the bottom of the containment structure 2A towards the relative outlet opening 2B.

According to an aspect, the mechanical reduction apparatus 4 comprises coupling means 10, 11, 15, 16 configured to mechanically couple the nut 8 and the longitudinal pushing element 9 with the shaft 6, such that a rotation of the nut 8 and/or of the longitudinal pushing element 9 results in a translation of the shaft 6 along the rotation axis X.

In other words, the actuator 1 is capable of ensuring a translation of the shaft 6 along the rotation axis X even in failure conditions of the drive means 5, or of the relative electronics, or of the seizing of the coupling means 10, 11, 15 and 16 with the nut 8 and with the longitudinal pushing element 9 indistinctly.

Such a result is achieved without the use of differential systems such as gearboxes.

To this end, the coupling means 10, 11, 15 and 16 comprise an intermediate coupling stage 10 interposed between the nut 8 and the longitudinal pushing element 9. Specifically, such a configuration envisages that the intermediate stage 10 surrounds the longitudinal pushing element 9 and that the nut 8 in turn surrounds the intermediate coupling stage 10.

It should be noted that the intermediate coupling stage 10 extends along a main extension direction between a first end 10' facing the bottom of the containment structure and an opposite second end 10".

In accordance with a preferred embodiment, the coupling means 10, 11, 15 and 16 comprise:

first and second mechanical connection means 15, 16 configured to mechanically couple the intermediate coupling stage 10 with the nut 8 and the intermediate coupling stage 10 with the longitudinal pushing element 9, and third mechanical connection means 11.

In particular, the shaft 6 is at least partially fitted into the intermediate coupling stage 10 and is connected with the latter through the second mechanical connection means 11.

In accordance with a preferred embodiment, the shaft 6 is at least partially fitted into the longitudinal pushing element 9. Specifically, the longitudinal pushing element 9 has a cavity within which the shaft 6 is slidably fitted.

According to an aspect, the intermediate coupling stage 10 extends around an axis which is coincident with the aforementioned rotation axis X.

The intermediate coupling stage 10 has an internal cavity, preferably of the through type, which extends along an axis coincident with the aforementioned rotation axis X and which therefore confers a tubular conformation to the aforesaid intermediate coupling stage 10. Specifically, the shaft 6 is fitted both into the cavity of the longitudinal pushing element 9 and in that of the coupling stage 10 as shown in the figures.

Therefore, also with reference to FIGS. 1 to 7, the shaft 6 is found to be coaxial with both the intermediate coupling stage 10 and with respect to the nut 8 and the longitudinal pushing element 9 along the rotation axis X as well as the intermediate coupling stage 10 is found to be coaxial with respect to the nut 8 and the longitudinal pushing element 9 always along the rotation axis X.

According to an aspect, always with reference to FIGS. 1 to 7, it is noted that the first mechanical connection means 15 preferably comprise a screw-nut coupling or, alternatively, a coupling made by means of satellite rollers, recirculating rollers or recirculating ball screws.

With reference to the preferred embodiments of FIGS. 1-3 and 7, the third mechanical connection means 11 comprise a screw-nut coupling between said shaft 6 and said intermediate coupling stage 10, such that a rotation of said nut 8 and/or of the longitudinal pushing element 9 determines a rotation or a translation or a rototranslation of the intermediate coupling stage 10 along the rotation axis X and that the intermediate coupling stage 10, in turn, determines a translation of the shaft 6 along the rotation axis X.

In accordance with the present preferred embodiment, it is noted that the shaft 6 can be a screw shaft and the third mechanical connection means 11 comprise a screw-nut coupling between the screw shaft 6 with the intermediate coupling stage 10.

Specifically, the intermediate coupling stage 10 internally comprises a threaded element 10C having a relative thread. Such a threaded element 10C is configured to couple with a thread 6A of the shaft 6. Preferably, such a threaded element 10C is arranged near the second terminal end 10" opposite the first terminal end 10' of said intermediate coupling stage 10.

Figure 4:
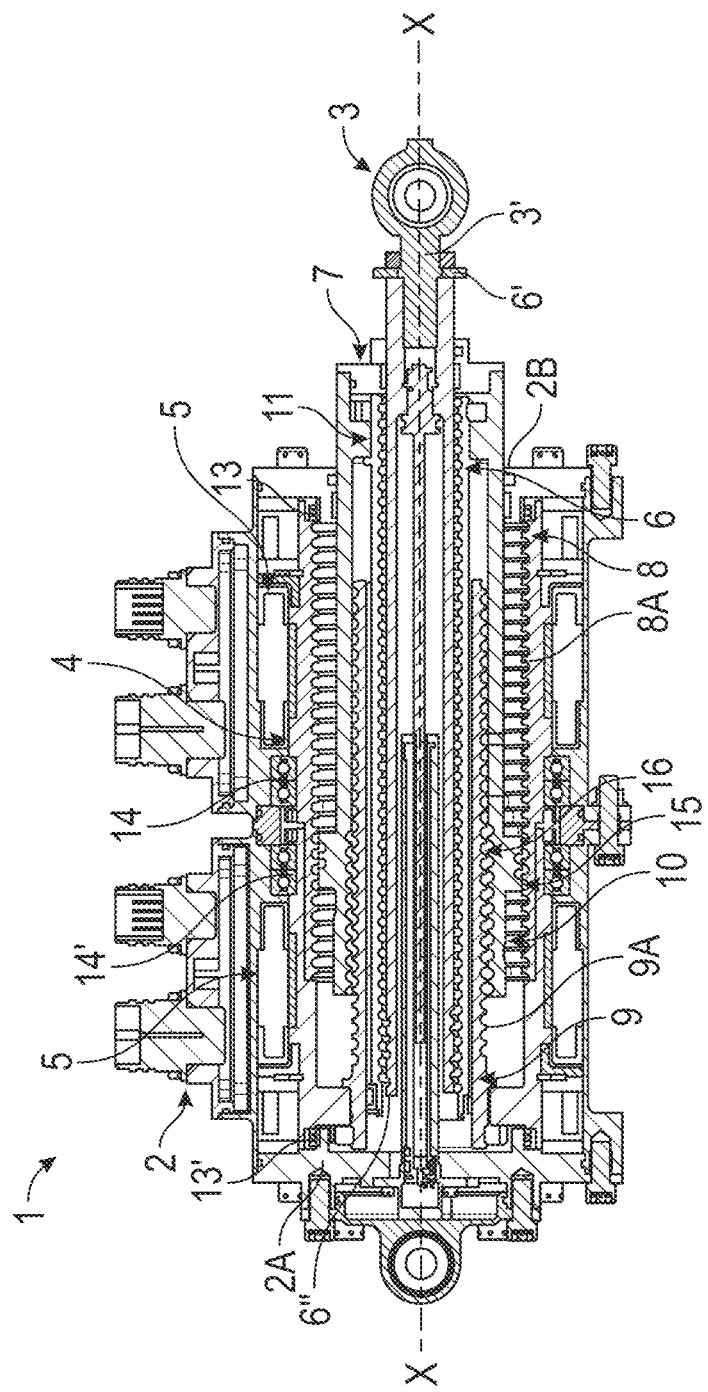
FIG. 4 shows a sectional view of the linear electromechanical actuator in accordance with a second embodiment of the present invention.
Figure 5:
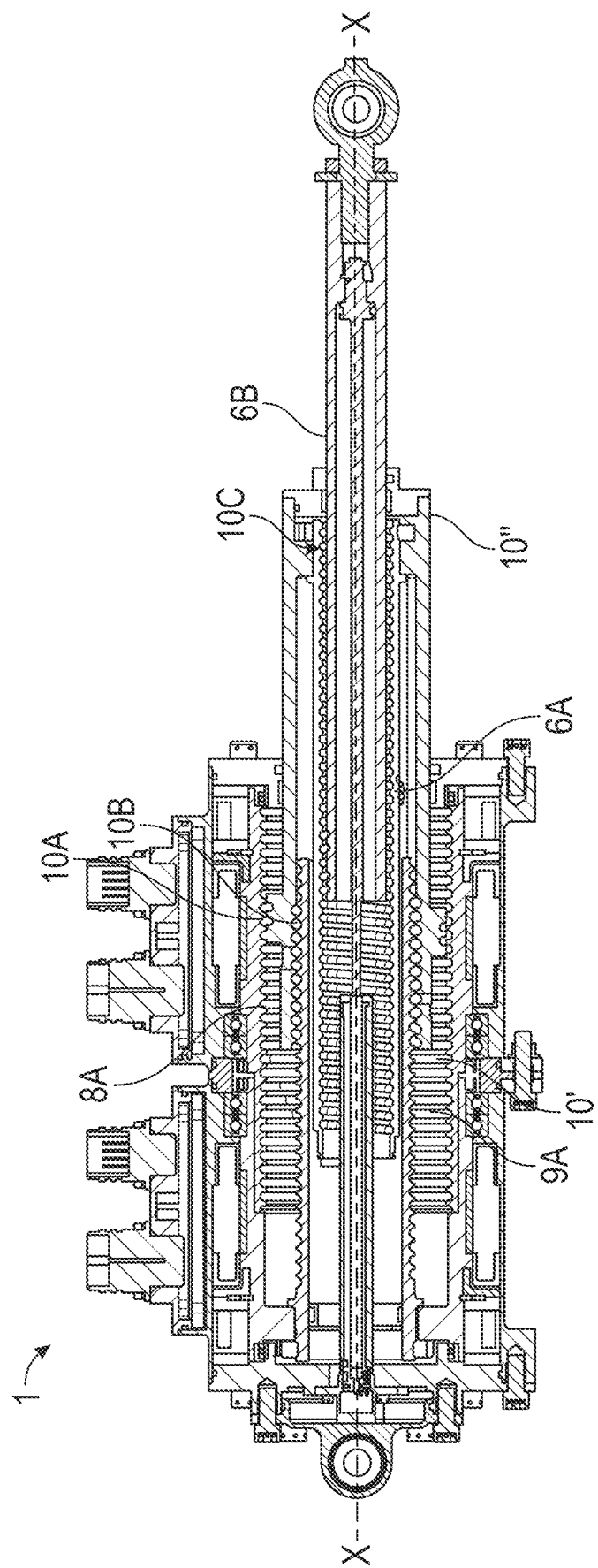
FIG. 5 shows a sectional view of the linear electromechanical actuator in accordance with the embodiment of FIG. 4 in a first extraction configuration.
Figure 6:
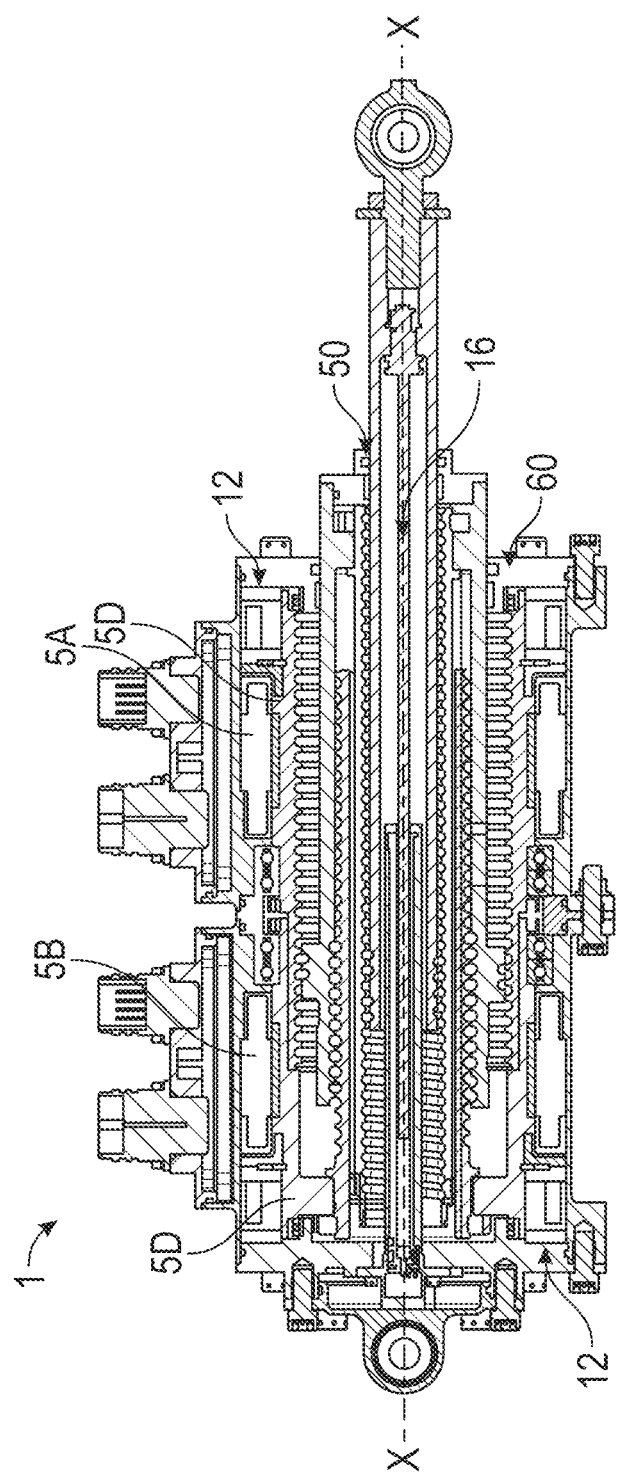
FIG. 6 shows a sectional view of the linear electromechanical actuator in accordance with the embodiment of FIG. 4 in a second extraction configuration.

In an alternative embodiment illustrated in FIGS. 4-6, the intermediate coupling stage internally comprises a threaded element 10C with the relative thread extending from the second terminal end 10" of the intermediate coupling stage 10 towards the inside of the containment structure 2 until at least interposing between said shaft 6 and said longitudinal pushing element 9. It should be noted that the thread 6A of the shaft 6 is arranged near the second end of said shaft 6" and configured to couple with the thread of the threaded element 10C. Preferably, the shaft 6 has a smooth external surface extending from the first end 6' of the shaft to the respective thread 6A. In other words, the shaft 6 has a smooth portion 6B and a threaded portion on the external surface where the smooth portion preferably extends for a greater portion with respect to the threaded portion.

For the aforesaid embodiments, a rotation of the nut 8 and/or the longitudinal pushing element 9, imparted by the drive means 5, results in a rotation or a translation or a rototranslation of the intermediate coupling stage 10 along the rotation axis X and the intermediate coupling stage 10, in turn, determines a translation of the screw shaft 6 along said rotation axis X.

In accordance with a preferred embodiment illustrated in FIGS. 1-6, the intermediate coupling stage 10 is interconnected with the nut 8 through a respective screw-nut coupling obtained with the respective first mechanical connection means 11 and with the longitudinal pushing element 9 through a respective screw-nut coupling obtained with the respective second mechanical connection means 15. Alternatively, the first and the second mechanical connection means 11, 15 can be embodied in a mechanical coupling of the satellite roller, recirculating roller or recirculating ball screw type.

Following a rotation of the nut 8 and/or of the longitudinal pushing element 9 induced by the drive means 5, a rotation or a translation or a rototranslation of the intermediate coupling stage 10 along the rotation axis X is determined and the latter, i.e., the intermediate coupling stage 10, determines a translation of the shaft 6 along said rotation axis X.

To this end, in the present preferred embodiment, the intermediate coupling stage 10 externally has, i.e., on its external surface, a first thread 10A configured to couple to the nut and an internal coupling element 10B to couple with the respective longitudinal pushing element 9. Specifically, such a coupling element 10B has a second thread configured to couple with the thread of the longitudinal pushing element 9. Preferably, the coupling between the intermediate coupling stage 10 and the nut 8 is embodied in the screw-nut coupling where the intermediate coupling stage 10 is the screw and the nut 8 is the nut and the coupling between the intermediate coupling stage 10 and the longitudinal pushing element 9 is embodied in the screw-nut coupling where the intermediate coupling stage 10 is the nut and the longitudinal pushing element 9 is the screw.

For example, the first thread 10A is coupled with the thread of the nut 8 and the second thread 10B of the coupling element is coupled with the defined pitch thread 9A of the longitudinal pushing element 9.

According to an aspect, it is envisaged that the first thread 10A is arranged near the first terminal end 10' of the intermediate coupling stage 10 as well as the coupling element 10B with the relative thread.

Such a first and second thread 10A and 10B preferably cover only a portion of the external and internal surface of the intermediate coupling stage 10, in particular a portion originating from the respective terminal end 10' and extending towards the central zone of the intermediate coupling stage 10. The remaining external and internal surface has a substantially smooth shape, excluding the coupling element 10C.

Since the nut 8 and the longitudinal pushing element 9 are independent of each other but are still mechanically constrained with the engagement of the screw-nut with the intermediate coupling stage 10, then also the first and second thread 10A and 10B of the intermediate coupling stage 10 are constrained to each other since the intermediate element 10 is made thereon.

Figure 7:
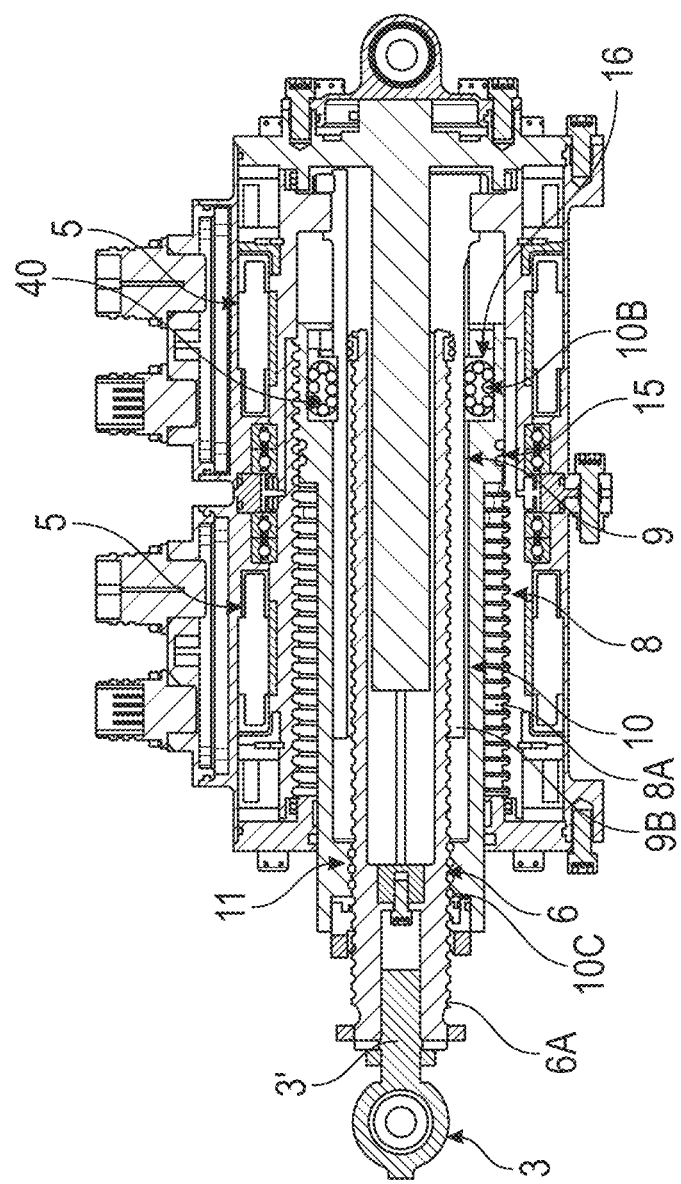
FIG. 7 shows a sectional view of the linear electromechanical actuator in accordance with a third embodiment of the present invention.

In accordance with an alternative embodiment illustrated in FIG. 7, the intermediate coupling stage 10 is interconnected with the nut 8 through a respective screw-nut coupling obtained with the respective first mechanical connection means 11 and with the longitudinal pushing element 9 through a respective linear guide-recirculating coupling of balls or rollers obtained with the respective second mechanical connection means 15. Alternatively, the first mechanical connection means 11, 15 can be embodied in a mechanical coupling of the type with satellite rollers, recirculating rollers or recirculating ball screws.

Also in this case, following a rotation of the nut 8 and/or of the longitudinal pushing element 9 induced by the drive means 5, a rotation or a translation or a rototranslation of the intermediate coupling stage 10 along the rotation axis X is determined and the latter, i.e., the intermediate coupling stage 10, determines a translation of the shaft 6 along said rotation axis X.

To this end, in the present preferred embodiment, the intermediate coupling stage 10 externally has, i.e., on its external surface, a first thread 10A configured to couple to the nut and an internal coupling element 10B to couple with the respective longitudinal pushing element 9. Specifically, such a coupling element 10B has a recirculating roller or recirculating ball device 40 coupled to the linear guide 9B. Preferably, the coupling between the intermediate coupling stage 10 and the nut 8 is embodied in the screw-nut coupling where the intermediate coupling stage 10 is the screw and the nut 8 is the nut and the coupling between the intermediate coupling stage 10 and the longitudinal pushing element 9 is embodied in the coupling between the linear guide 9B of the pushing element 9 and the recirculating balls or rollers of the intermediate coupling stage 10 acting on the linear guide.

For example, the first thread 10A is coupled with the thread of the nut 8 and the recirculating roller or recirculating ball device 40 of the coupling element 10B is coupled with the external surface of the longitudinal pushing element 9.

According to an aspect, it is also envisaged in this case that the first thread 10A is arranged near a first terminal end 10' of the intermediate coupling stage 10 as well as the coupling element 10B with the relative device 40. It should be noted that the first thread 10A preferably covers only a portion of the external surface of the intermediate coupling stage 10 near the respective terminal end 10' and extends towards the central zone of the intermediate coupling stage 10. The recirculating ball device of the coupling element 10B is arranged inside the surface of the intermediate stage 10 also near the first end 10', interposing itself between the intermediate coupling stage 10 and the longitudinal pushing element 9.

Also in this case, since the nut 8 and the longitudinal pushing element 9 are independent of each other but are still mechanically constrained with the screw-nut engagement and linear recirculating ball or recirculating roller guide with the intermediate coupling stage 10, then also the first 10A and the recirculating roller or recirculating ball device 40 of the coupling element 10B of the intermediate coupling stage 10 are constrained with each other since the intermediate element 10 is made thereon.

According to an aspect for the described embodiments, it is envisaged that the intermediate coupling stage 10 internally has the previously described threaded element 10C intended to couple with a thread 6A of the shaft 6.

Specifically, the shaft 6 has a relative thread, which has a certain pitch and direction and which is interconnected with the thread of the threaded element 10C so as to achieve the screw-nut coupling therebetween.

According to an aspect, the thread pitch of the shaft 6 is different, for example greater or lesser, with respect to the thread pitch of the nut 8 and the thread pitch or movement pitch of the longitudinal pushing element 9.

In particular, it is envisaged that:
in the event of screw-nut coupling, the thread pitch of the nut 8 is towards the left while that of the longitudinal pushing element 9 is towards the right, or vice versa (i.e., the thread direction of the nut 8 is towards the right while that of the longitudinal pushing element 9 is towards the left). Instead in the event of linear guide coupling and recirculating balls or rollers, the thread pitch of the nut 8 is such as to be opposite to the movement pitch of the recirculating roller or recirculating ball device 40.

In accordance with a preferred embodiment, the containment structure 2 comprises first cleaning elements 50 externally acting on said intermediate stage 10. Specifically, the first cleaning elements 50 arranged at the outlet opening 2B, preferably encircling it internally, are configured to act on the external surface of the intermediate coupling stage 10 to prevent any dirt accumulating on the external surface from being introduced into the containment structure during the back-and-forth motion.

In accordance with a preferred embodiment, combinable with the previous one, the intermediate coupling stage 10 comprises second cleaning elements 60 externally acting on said shaft 6. Specifically, the second cleaning elements 60 arranged at the second end 10" of the intermediate stage, preferably encircling it internally, are configured to act on the external surface of the shaft 6 to prevent any dirt accumulating on the external surface from being introduced into the containment structure during the back-and-forth motion.

As previously described, the nut 8 and the longitudinal pushing element 9 are rotatable about the rotation axis X under the action of the drive means 5, which, preferably, are directly connected to the nut and to the longitudinal pushing element.

To this end, the drive means 5 comprise two electric motors 5A and 5B each of which is directly active on the nut 8 and on the longitudinal pushing element 9.

In particular, each electric motor 5A and 5B comprises a stator fixed to the containment structure 2 and a rotor fixed to the nut 8 and to the longitudinal pushing element 9, respectively.

Therefore, the rotor of each electric motor 5A and 5B is in rigid connection with the nut 8 and the longitudinal pushing element 9 respectively, which, one or both, are rotated by the electromagnetic interaction of the respective rotor (generally with permanent magnets) and stator.

For example, also with reference to the figures, it is noted that the rotor of the electric motor 5A is fixed on the nut 8 while the rotor of the motor 5B is fixed on the longitudinal pushing element 9.

In an alternative embodiment, it is envisaged that the drive means 5 are respectively connected with the nut 8 and the longitudinal pushing element 9 through a kinematic chain (not illustrated in the figures) to distribute the torque to one or both of the nut 8 and the longitudinal pushing element.

According to an aspect, in order to fix each rotor of the electric motor 5A and 5B to the nut 8 and to the longitudinal pushing element, respectively, the actuator 1 comprises fixing means globally indicated with reference 5D.

In particular, the fixing means 5D can comprise:
a layer of adhesive interposed between the external surface of the nut 8 and the longitudinal pushing element 9 and the rotor associated therewith to constrain it integrally;
a sleeve arranged outside the rotor so as to retain it in a preset position.

Also with reference to FIGS. 1-7, in which the nut 8 and the rotor 5C of the motor 5A are shown, it is noted that the rotor 5C consists of a plurality of magnetic elements arranged circumferentially on the nut while the sleeve 21, for example made of metallic material, wraps the rotor 5C along the external surface of the nut 8.

The actuator 1 comprises braking means 12 active on the nut 8 and on the longitudinal pushing element 9 for braking the rotation about the rotation axis X of one and/or both, depending on the operating conditions to which the actuator 1 is subjected as described in more detail below.

In particular, the braking means 12 comprise two electric-type brakes each of which is active respectively on the nut 8 and on the longitudinal pushing element 9.

The brakes are for example specifically electromagnetic coil brakes. Specifically, they are normally open (the brake is closed by activating the electromagnet) or normally closed (the brake is opened by activating the electromagnet).

It should be noted that each electric motor 5A and 5B as well as each electric brake 12 is controlled by its own control electronics (not shown in the figures), which defer to control and command the operating state, is the operation of said electric motors 5A and 5B and electric brakes 12.

Therefore in the described preferred embodiments, the actuator 1 comprises two independent electric motors 5A and 5B and two independent electronics which move a mechanics (i.e., the nut 8, the longitudinal pushing element 9, an intermediate stage 10 and a shaft 6) fully redundantly without the use of gearboxes and comprises the use of a nut 8 and a longitudinal pushing element 9, one with thread towards the right and the other towards the left or opposite thread and movement pitch (towards the right and the other towards the left), independent on which the rotors of the two electric motors 5A and 5B are directly connected. The nut 8 and the longitudinal pushing element 9 engage the intermediate stage 10 having relative coupling portions internally and externally to engage the nut 8 and the longitudinal pushing element 9. Therefore, the intermediate stage 10 has a threaded element which engages the thread of the shaft which does not rotate thanks to the anti-rotation device.

Figure 2:
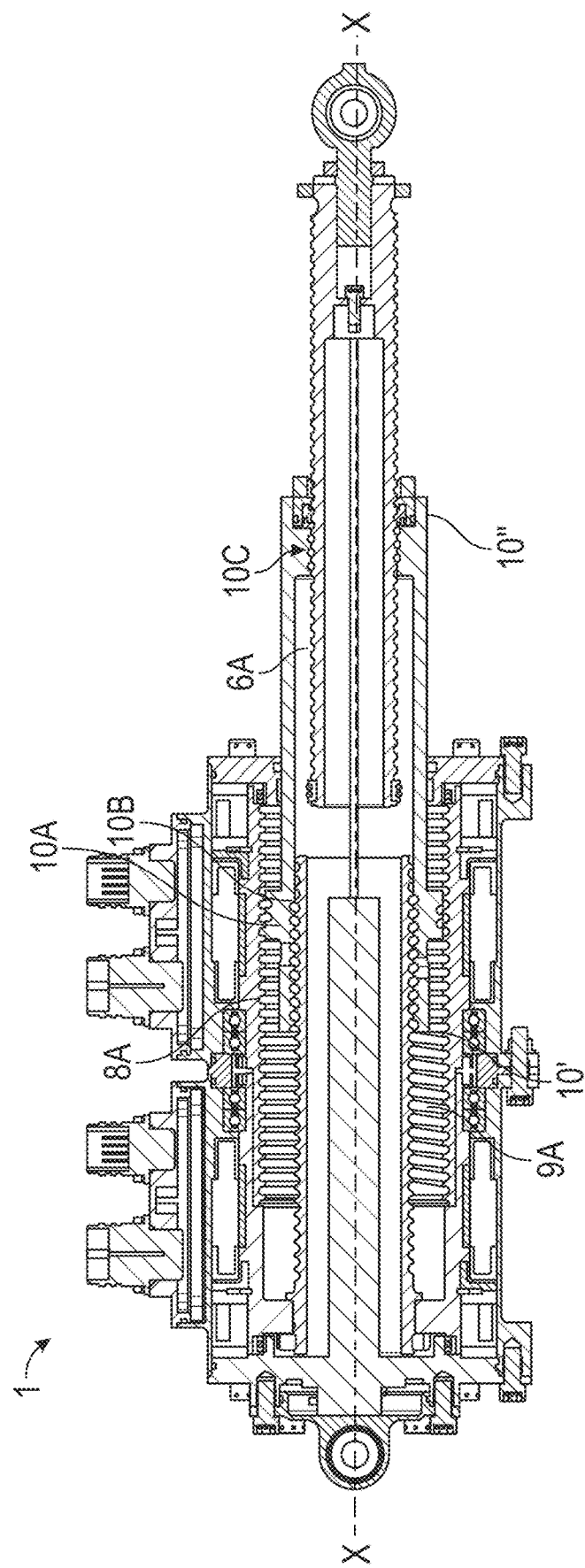
FIG. 2 shows a sectional view of the linear electromechanical actuator in accordance with the embodiment of FIG. 1 in a first extraction configuration.
Figure 3:
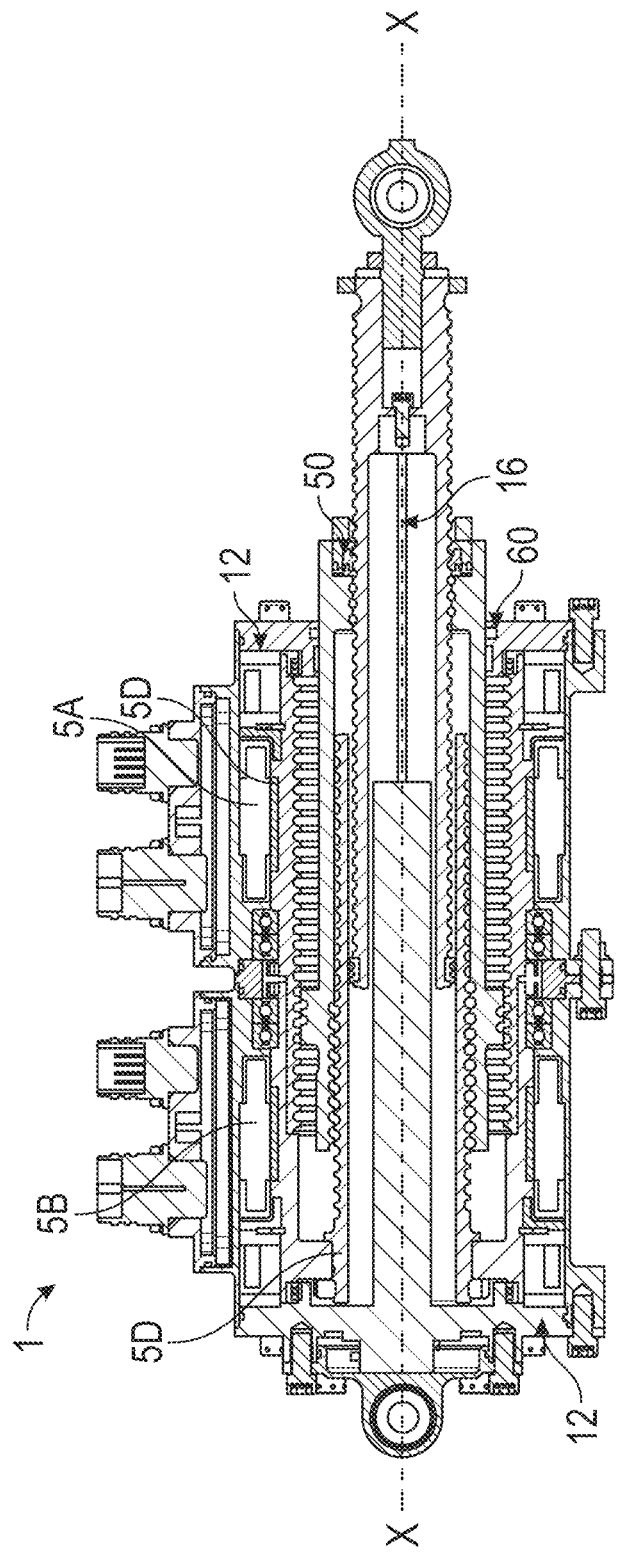
FIG. 3 shows a sectional view of the linear electromechanical actuator in accordance with the embodiment of FIG. 1 in a second extraction configuration.

It should also be noted, again in the preferred embodiment disclosed with reference to FIG. 2 or 3, that the right-pitch and left-pitch coupling between the intermediate stage 10 and the nut 8 and the longitudinal pushing element 9, allows to know the position of the intermediate stage 10 with respect to the nut 8 and the longitudinal pushing element 9 themselves and to the shaft. This allows to define a position range in which the jamming between intermediate stage 10 and the nut 8 and/or the longitudinal pushing element or between intermediate stage 10 and shaft 6 can occur to a much more limited extent with respect to the actuators of the known art. Advantageously, this entails having a much more compact actuator and therefore with lower weights while ensuring the complete stroke of the actuator 1 even in jamming conditions.

The actuator comprises a plurality of sensors, arranged inside and/or outside the containment structure 2 and suitably configured to be in signal communication with the command and control electronics, which are designed to detect the position of the shaft 6 so as to detect its movements along the axis X.

For example, the actuator 1 can comprise one or more of the following types of sensors:
- a linear sensor (indicated with 16 in accordance with the embodiment illustrated in the figures positioned inside the shaft 6), and configured to detect the axial position of the shaft 6;
- stroke-end sensors active on the shaft;
- rotary sensors associated with the nut 8 and the longitudinal pushing element 9 respectively and each one configured to detect the relative rotation thereof;
- proximity sensors located between the nut 8 and the longitudinal pushing element 9 and configured to read the axial position of the intermediate coupling stage 10.

Such sensors are connected by means of command/control electronics and suitable software so as to monitor the relative movements between the shaft 6, the nut 8, the longitudinal pushing element 9, the intermediate coupling stage 10 and the containment structure 2.

For example, the proximity sensor and the linear sensor 16 are capable of homing the rotary sensors. Advantageously, the proximity sensor and the linear sensor identify a reference point for the first and the second rotary sensor obtaining the position of the nut 8 and the longitudinal pushing element 9

Advantageously, the presence of multiple sensors ensures a redundancy for the measurement of the axial position of the shaft 6.

It should be noted that only two sensors among the plurality envisaged would be sufficient to obtain, through mathematical correlations, the axial position of the shaft 6.

However, by using the plurality of sensors as described, the actuator 1 is capable of tolerating the breakage of up to two sensors.

Advantageously, the control/command electronics correlate the sensor outputs to identify a mechanical failure (known as "jamming") between the shaft 6 and the intermediate coupling stage 10 or between the nut 8 and the longitudinal pushing element 9 and the intermediate coupling stage 10.

The operation of the actuator 1 in its preferred embodiment will now be disclosed.

Normal Operating Mode

During normal operation the two electric motors 5A and 5B can drive, at the request of the respective electronics, the nut 8 and/or the longitudinal pushing element in the same rotation direction or in the opposite rotation direction with respect to each other.

If the operation of the two motors 5A and 5B moves the nut 8 and the longitudinal pushing element in the same rotation direction, then the intermediate stage 10 rotates integrally with the nut 8 and the longitudinal pushing element. Thanks to the action of the anti-rotation device, the shaft 6 translates.

If the operation of the two motors 5A and 5B moves the nut 8 and the longitudinal pushing element in the opposite direction, then the torque of one motor is counterbalanced by the torque of the other motor and the intermediate stage 10 translates. The shaft 6 translates integrally with the intermediate stage 10.

Ultimately, in normal operating mode, the intermediate stage 10 can rotate, translate or rotate-translate and the shaft 6, thanks to the action of the anti-rotation device, translates along the rotation axis X so as to obtain the linear back-and-forth motion, again along the rotation axis X, of the pusher 3.

Operating Mode in the Event of Failure (Failure of One of the Two Electric Motors or Related Electronics Indistinctly)

If there is a failure of one of the two electric motors 5A or 5B or of the relative electronics indistinctly, then the electric brake 12A or 12B is driven and blocks the rotation of the nut 8 or of the longitudinal pushing element 9 on the side of the non-operating motor/electronics, for example the brake 12A blocks the rotation of the nut 8 if the failure is of the motor 5A and/or of its control and command electronics.

In this scenario, the intermediate stage 10 rotates-translates along the rotation axis X due to the rotation of the longitudinal pushing element 9 driven by the electric motor 5B. The shaft 6, thanks to the action of the anti-rotation device, translates along the rotation axis X due to the translation and rotation of the intermediate stage 10 since it is coupled with the threaded element 10C with the thread of the shaft 6.

The translation of the shaft 6 allows to obtain the linear motion of the pusher 3, always along the rotation axis X.

Operating Mode in the Event of Failure (Seizing of the Intermediate Stage with a Nut or with the Longitudinal Pushing Element)

If there is a mechanical failure (known as "jamming") of the intermediate stage 10 with the nut 8 or with the longitudinal pushing element 9 indistinctly, for example seizing of the intermediate stage 10 with the nut 8.

In such a scenario, the two electric motors 5A and 5B are driven by the respective electronics in the same rotation direction. The intermediate stage 10 rotates about the rotation axis X integrally with the nut 8 and the longitudinal pushing element 9. The shaft 6, thanks to the action of the anti-rotation device, translates along the rotation axis X so as to obtain the linear back-and-forth motion, again along the rotation axis X, of the pusher 3.

Operating Mode in the Event of/Failure (Seizing of the Shaft with the Intermediate Stage)

If there is a failure (known as "jamming") of the shaft 6 with the intermediate stage 10, then the two electric motors 5A and 5B are driven by the respective electronics with the opposite rotation direction. The torque of one motor is counterbalanced by the torque of the other motor and the intermediate stage 10 translates only along the rotation axis X. The shaft 6 translates along the rotation axis X integrally with the intermediate stage 10 so as to obtain the linear back-and-forth motion, again along the rotation axis X, of the pusher 3.

It is a further object of the present invention to provide a method for checking an electrical, electronic and/or mechanical fault in the linear electromechanical actuator 1 disclosed above.

Thanks to an embodiment of the present method, it is possible to provide a method for checking in a linear electromechanical actuator, of the Fault Tolerant Differential Direct Drive type, any electrical, electronic and/or mechanical faults, such as latent faults.

Advantageously, the method according to the present invention allows to identify the type of fault in a linear electromechanical actuator with greater reliability with respect to the prior art disclosed above.

Furthermore, thanks to an embodiment of the present invention, it is possible to provide a method which that identifies the type of mechanical failure in the linear electromechanical actuator and which drives the electric motors so as to overcome the failure detected. In particular, the actuator is provided with a series of sensors which cooperate with each other to identify the type of failure.

Figure 8:
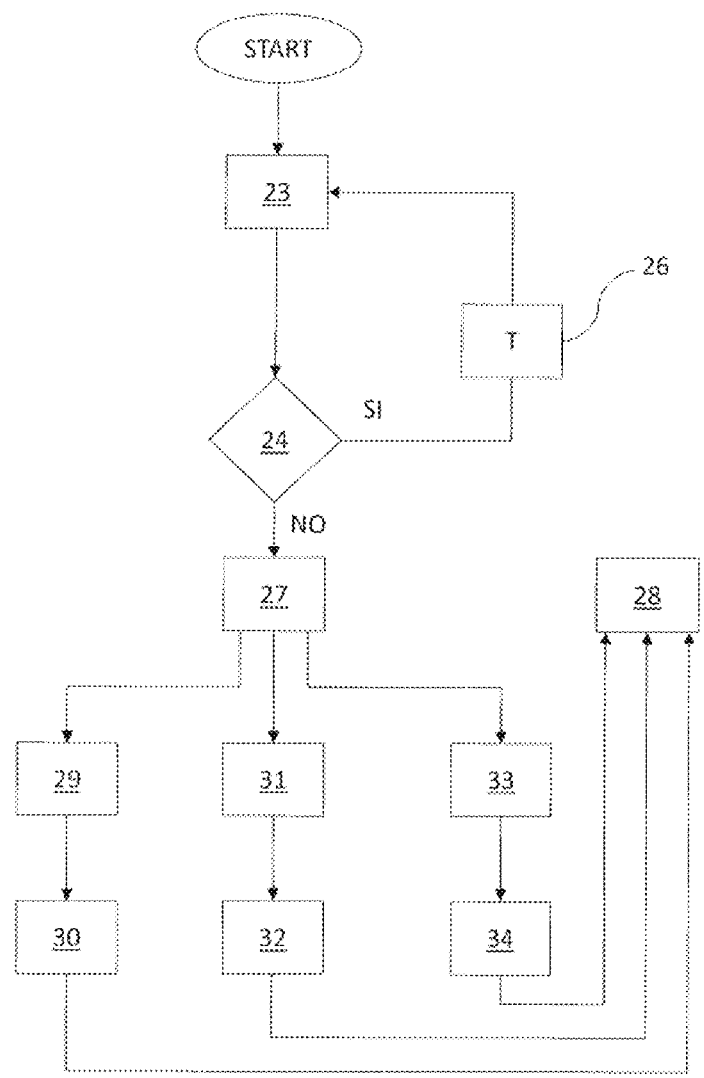
FIG. 8 shows a flow chart of the method for checking the presence of an electrical, electronic and/or mechanical fault in a linear electromechanical actuator, in accordance with the present invention.

With reference to the operating modes described above, the method for checking the existence of any problems or faults, in particular latent failures, in the electromechanical actuator 1 in accordance with the diagram in FIG. 8 will now be described.

Operating Mode to Check the Presence of any Faults

During normal operation, it is possible to check for faults, in particular latent failures of an electrical, electronic, and/or mechanical type in the linear electromechanical actuator 1 by means of the steps of:

activating 23 the two electric motors 5A, 5B, block 23, to move the nut 8 and the longitudinal pushing element in the same rotation direction or in an opposite rotation direction;

checking 24, during said activating step of the two electric motors 5A, 5B, block 24, that the shaft 6 translates with respect to said containment structure 2.

In particular, thanks to the command and control electronics and the plurality of sensors 16-20, it is possible to identify whether the shaft 6 is actually translated with respect to the containment structure 2.

According to an aspect, if there are no faults, branch YES of block 24, then it is envisaged that the step of activating the two electric motors 5A, 5B occurs with a predetermined activation interval T, block 26.

For example, the activation interval T can have a repetition rate of constant or variable duration.

If the shaft 6 does not move with respect to the containment structure 2, branch NO of block 24, then it is envisaged to intervene according to one of the methods provided to ensure the correct operation of the actuator 1, block 27 step of determining the type of fault, and to signal the type of anomaly found, block 28.

In particular, if the command and control electronics does not detect the translation of the shaft 6, then the control electronics enters a so-called failure operating mode.

To this end, the command and control electronics through the sensors 16-20 identifies which electrical or electronic component (for example one of the two electric motors or the electronics itself) or mechanical component (for example seizing of the intermediate stage with one among nut and longitudinal pushing element indistinctly or seizing of the shaft with the intermediate stage) has a fault.

The following illustrates how to identify and remedy, in the event of a failure of an electrical or electronic component or a mechanical component of the actuator 1.

In such scenarios, the method always envisages reporting the detected fault, block 28.

Operating Mode in the Event of Failure of One of the Two Electric Motors or Related Electronics Indistinctly The method determines which type of fault has occurred, and if the failure is in one of the two electric motors 5A or 5B or in the relative electronics indistinctly, block 29, then a step is envisaged to drive the electric brake 12A or 12B so as to block the rotation of the nut 8 or of the longitudinal pushing element on the side of the non-operating motor/electronics, block 30.

Operating Mode in the Event of Failure (Seizing of the Intermediate Stage with One Among the Nut and the Longitudinal Pushing Element)

The method determines, which type of failure has occurred, and if the failure is a mechanical failure (known as "jamming") of the intermediate stage 10 with the nut 8 or the longitudinal pushing element 9 indistinctly, block 31, for example seizing of the intermediate stage 10 with the nut 8, then a step is envisaged to drive the two electric motors 5A and 5B from the respective electronics in the same rotation direction, block 32.

Operating Mode in the Event of Failure (Seizing of the Shaft with the Intermediate Stage)

The method determines, which type of fault occurred and if the failure is a failure (known as "jamming") of the shaft 6 with the intermediate stage 10, block 33, then there is a step of activating the two electric motors 5A and 5B are driven by the respective electronics with opposite rotation direction, block 34.

Obviously, in order to satisfy specific and contingent needs, a person skilled in the art may apply numerous changes to the variants described above, all without departing from the scope of protection as defined by the following claims.

The invention claimed is:

1. Linear electromechanical actuator, comprising:
 a containment structure;
 a pusher configured to translate relative to the containment structure in order to at least partially protrude from the containment structure during the actuator operation;
 a mechanical reduction apparatus arranged in the containment structure and rotatable about a rotation axis;
 drive means arranged in the containment structure and operatively connected to said mechanical reduction apparatus to rotate it about said rotation axis;
 a shaft at least partially externally threaded extending between a first end connected to the pusher and an opposite second end, said shaft being fitted into said mechanical reduction apparatus and connected to said pusher, said shaft being mechanically connected to said mechanical reduction apparatus such that a rotation of said mechanical reduction apparatus determines a translation of the shaft along said rotation axis;

an anti-rotation mechanism active on said shaft to prevent the shaft from rotating about said rotation axis;

said anti-rotation mechanism being arranged internally and/or externally to said containment structure;

characterised in that said mechanical reduction apparatus comprises:

a nut having a thread pitch;

a longitudinal pushing element along said rotation axis, said nut and said longitudinal pushing element being independent of each other and rotatable about said rotation axis under the action of said drive means;

said longitudinal pushing element being fitted into said nut;

coupling means configured to mechanically couple said nut and said longitudinal pushing element with said shaft, such that a rotation of said nut and/or of said longitudinal pushing element determines a translation of said shaft along said rotation axis;

said coupling means comprising:

an intermediate coupling stage interposed between the nut and the longitudinal pushing element, said shaft being at least partially fitted into said intermediate coupling stage and into said longitudinal pushing element.

2. Linear electromechanical actuator according to claim 1, wherein said coupling means comprise:

first and second mechanical connection means for mechanically coupling said intermediate coupling stage with said nut and said intermediate coupling stage with said longitudinal pushing element respectively;

third mechanical connection means;

said shaft is connected to the intermediate coupling stage through said third mechanical connection means.

3. Linear electromechanical actuator according to claim 2, wherein:

said first mechanical connection means comprise a screw-nut coupling or a coupling by satellite rollers, recirculating rollers or recirculating ball screw.

4. Linear electromechanical actuator according to claim 3, wherein said intermediate coupling stage comprises:

externally a first thread configured to couple with the nut and internally a coupling element configured to couple with the respective longitudinal pushing element.

5. Linear electromechanical actuator according to claim 4, wherein said first thread and said coupling element being arranged near a first terminal end of said intermediate coupling stage facing inwards of said containment structure.

6. Linear electromechanical actuator according to claim 4, wherein:

the longitudinal pushing element is a screw with a defined thread pitch;

the coupling element has a second thread configured to couple with the thread of the longitudinal pushing element; said second mechanical connection means comprising a screw-nut coupling or a coupling by satellite rollers, recirculating rollers or recirculating ball screw.

7. Linear electromechanical actuator according to claim 4, wherein:

the longitudinal pushing element is a linear guide;

the coupling element having a recirculating roller or recirculating ball device coupled to the linear guide; said second mechanical connection means comprising a recirculating roller or recirculating ball coupling.

8. Linear electromechanical actuator according to claim 6, wherein said third mechanical connection means comprise a screw-nut coupling between said shaft with said intermediate coupling stage, such that a rotation of said nut and/or of said longitudinal pushing element determines a rotation or a translation or a rototranslation of said intermediate coupling stage along said rotation axis and that said intermediate coupling stage, in turn, determines a translation of said shaft along said rotation axis.

9. Linear electromechanical actuator according to claim 3, wherein said intermediate coupling stage internally comprises a threaded element having a relative thread configured to couple with a thread of said shaft, said threaded element being arranged near a second terminal end opposite to the first terminal end of said intermediate coupling stage;

said shaft is a screw shaft, the thread of said screw shaft being configured to couple with the thread of said threaded element.

10. Linear electromechanical actuator according to claim 3, wherein said intermediate coupling stage internally comprises a threaded element, said threaded element being extended from a second terminal end opposite to the first end of said intermediate coupling stage inwards of said containment structure until it is at least interposed between said shaft and said longitudinal pushing element;

said thread of said shaft arranged near the second end of said shaft and configured to couple with the thread of said threaded element, said shaft having a smooth external surface extending from said first end of said shaft to the respective thread.

11. Linear electromechanical actuator according to claim 1, wherein:

the containment structure comprises first cleaning elements externally acting on said intermediate stage;

the intermediate stage comprises second cleaning elements externally acting on said shaft.

12. Method for checking the presence of an electrical, electronic and/or mechanical fault in an electromechanical linear actuator, said electromechanical linear actuator according to claim 1 and comprising:

said drive means comprising two electric motors arranged in the containment structure and operatively connected with said nut and said longitudinal pushing element to rotate them about said rotation axis;

first and second electric brakes active on said nut and said longitudinal pushing element, respectively, to brake the rotation about said rotation axis;

a command and control electronics for each electric motor and electric brake comprising a plurality of sensors arranged within said containment structure operatively connected to the command and control electronics, said plurality of sensors being configured to detect the position of the shaft so as to detect displacements thereof along the axis;

said coupling means comprise:

respective first and second mechanical connection means to couple respectively said intermediate coupling stage with said nut and said intermediate coupling stage with said longitudinal pushing element, third mechanical connection means;

said shaft is at least partially fitted into said intermediate coupling stage and is connected to the intermediate coupling stage by said third mechanical connection means; said shaft being at least partially fitted into said longitudinal pushing element;

said method being characterised by the steps of:

activating said two electric motors to move said nut and said longitudinal pushing element in the same rotation direction or opposite rotation direction;

checking, by means of said plurality of sensors, during said step of activating said two electric motors, that said shaft translates with respect to said containment structure and if said shaft does not translate with respect to the containment structure;

checking if there is a mechanical failure of the intermediate stage with the nut or longitudinal pushing element, so as to actuate, the two electric motors in the same rotation direction;

checking if there is a mechanical failure of the shaft with the intermediate stage, so as to actuate, the two electric motors in an opposite rotation direction.

13. Method for checking the presence of an electrical, electronic and/or mechanical fault in a linear electromechanical actuator according to claim 12, comprising the steps, in case said shaft does not translate with respect to the containment structure, of:

checking whether one or both of said two electric motors or said control electronics have a failure;

actuating the first or second electrical brake so as to prevent the rotation of said nut or said longitudinal pushing element from the side of the non-functioning motor/electronics.

* * * * *